United States Patent
Sakurai et al.

(10) Patent No.: US 8,214,565 B2
(45) Date of Patent: Jul. 3, 2012

(54) COMMUNICATION APPARATUS, KVM SWITCH AND COMMUNICATION CONTROL METHOD

(75) Inventors: Satoshi Sakurai, Shinagawa (JP);
Katsuji Ideura, Shinagawa (JP);
Kazuhiro Yasuno, Shinagawa (JP);
Fujio Seki, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1007 days.

(21) Appl. No.: 12/010,559

(22) Filed: Jan. 25, 2008

(65) Prior Publication Data
US 2008/0180397 A1     Jul. 31, 2008

(30) Foreign Application Priority Data

Jan. 26, 2007   (JP) ................................ 2007-016261

(51) Int. Cl.
*G06F 13/12*  (2006.01)
*H04B 3/36*   (2006.01)
(52) U.S. Cl. ........................................ 710/62; 370/293
(58) Field of Classification Search ........... 710/62; 370/293
See application file for complete search history.

(56) References Cited

U.S. PATENT DOCUMENTS

| | | | |
|---|---|---|---|
| 2003/0218578 A1 | 11/2003 | Ahern et al. | |
| 2005/0179666 A1 | 8/2005 | Katayama et al. | |
| 2005/0204026 A1 | 9/2005 | Hoerl | |
| 2006/0107061 A1* | 5/2006 | Holovacs | 713/182 |
| 2006/0117120 A1 | 6/2006 | Takagi | |
| 2007/0257883 A1* | 11/2007 | Ke | 345/157 |
| 2008/0031165 A1* | 2/2008 | Shen et al. | 370/293 |
| 2008/0155124 A1* | 6/2008 | Compton et al. | 709/250 |

FOREIGN PATENT DOCUMENTS

| | | |
|---|---|---|
| JP | 9-219803 | 8/1997 |
| JP | 2001-268158 | 9/2001 |
| JP | 2002-007005 | 1/2002 |
| JP | 2005-525729 | 8/2005 |
| JP | 2005-234808 | 9/2005 |
| JP | 2006-157339 | 6/2006 |
| JP | 2006-203451 | 8/2006 |
| JP | 2007-538419 | 12/2007 |

OTHER PUBLICATIONS

Japanese Office Action issued Dec. 20, 2011 in corresponding Japanese Patent Application No. 2007-016261.

* cited by examiner

*Primary Examiner* — Hyun Nam
(74) *Attorney, Agent, or Firm* — Staas & Halsey LLP

(57) ABSTRACT

A KVM switch includes: server units respectively connected to computers; user units respectively connected to input/output devices for transmitting signals to the computers and receiving signals from the computers; and a main unit that connects the server units and the user units. Each of the server units, user units and main unit is a communication unit and includes: a first part communicating with another communication unit to inform the above another communication unit of unit type information about the communication unit and receive unit type information about the above another communication unit therefrom; and a second part controlling communications with the above another communication unit on the basis of the unit type information acquired from the above another communication unit.

17 Claims, 13 Drawing Sheets

Fig. 9

| MODEL # | M1 | M1 | M2 | M2 | M3 |
|---|---|---|---|---|---|
| VERSION # | V1.0 | V2.0 | V1.0 | V2.0 | V1.0 |
| COMMUNICATION SPEED | S1 | S2 | S2 | S3 | S3 |
| FUNCTION A | NOT AVAILABLE (0) | AVAILABLE (1) | AVAILABLE (1) | AVAILABLE (1) | AVAILABLE (1) |
| FUNCTION B | AVAILABLE (1) | AVAILABLE (1) | AVAILABLE (1) | AVAILABLE (1) | AVAILABLE (1) |
| FUNCTION C | NOT AVAILABLE (0) | NOT AVAILABLE (0) | AVAILABLE (1) | AVAILABLE (1) | AVAILABLE (1) |
| FUNCTION D | NOT AVAILABLE (0) | NOT AVAILABLE (0) | NOT AVAILABLE (0) | NOT AVAILABLE (0) | AVAILABLE (1) |

Fig. 10

| UNIT | SERVER UNIT | MAIN UNIT | USER UNIT |
|---|---|---|---|
| FUNCTION A | AVAILABLE (1) | AVAILABLE (1) | NOT AVAILABLE (0) |
| FUNCTION B | AVAILABLE (1) | AVAILABLE (1) | AVAILABLE (1) |
| FUNCTION C | AVAILABLE (1) | AVAILABLE (1) | AVAILABLE (1) |
| FUNCTION D | NOT AVAILABLE (0) | NOT AVAILABLE (0) | AVAILABLE (1) |

COMMUNICATION APPARATUS, KVM SWITCH AND COMMUNICATION CONTROL METHOD

BACKGROUND OF THE INVENTION

1. Field of the Invention

The present invention generally relates to a KVM switch used to selectively control computers by input/output devices each equipped with a keyboard, a mouse and a display.

2. Description of the Related Art

A KVM switch is provided between an input/output device and multiple computers, and makes a connection between the input/output device and any one of the computers. The user uses the KVM switch to select one of the computers that is to be connected to the input/output device.

FIG. 1 shows a computer network including a KVM switch, which includes server units 2a, 2b, ..., and 2n (n is a natural number), a main unit 3 and user units 4a, 4b, ..., and 4m (m is a natural number). Computers 1a through 1n are connectable to the server units 2a through 2n, respectively. A monitor 5a, a keyboard 6a and a mouse 7a, which form an input/output device, are connectable to the user unit 4a. Similarly, a monitor 5m, a keyboard 6m and a mouse 7m are connectable to the user unit 4m. In the following description, when any one of the server units 2a through 2n is referred to, a reference numeral 2 is used. Similarly, a reference number 4 is used when any one of the user units 4a through 4n is referred to. This rule is also applied to the computers 1a through 1n, the monitors 5a through 5m, the keyboards 6a through 6m and the mouses 7a through 7m. The main unit 3 selectively make connections between the server units 2a through 2n and the user units 4a through 4m.

A video signal is output from the computer 1, and applied to the main unit via the associated server unit 2. The main unit 3 selects one of the user units 4a through 4m to be connected by a matrix switch 12 (shown in FIG. 2), and outputs the video signal to the selected user unit 4. The video signal is then output to the monitor 5 via the selected user unit 4.

FIG. 2 is a block diagram of the main unit 3. The main unit 3 includes video signal input sections 11a, 11b, ..., and 11n (only two sections 11a and 11b are illustrated), the above-mentioned matrix switch 12, switch sections 13a, 13b, ..., and 13m (only two switch sections 13a and 13b are illustrated), and video signal output sections 14a, 14b, ..., and 14m (only two video signal output sections 14a and 14b are illustrated). The video signal input sections 11a through 11n receive video signals from the server units 2a through 2n, respectively. Further, the main unit 3 includes a microcomputer 15, a reference signal generator 16, and a keyboard/mouse signal combiner 17. The matrix switch 12 switches output destinations for the input video signals. The switch sections 13a through 13m are supplied with a reference signal generated by the reference signal generator 16. Each of the switch sections 13a through 13m selects either the corresponding video signal or the reference signal. The video signal output sections 14a through 14m outputs the video signals or the reference signals to the corresponding user units 4a through 4m. The microcomputer 15 controls the switch sections 13a through 13m, and the keyboard/mouse signal combiner 17. This keyboard/mouse signal combiner 17 combines control signals of the keyboards and mouses.

At a time of adjusting the video signals, the microcomputer 15 controls the switch sections 13a through 13m to output the reference signals to the video signal output sections 14a through 14m, which supplies the received reference signals to the user units 4a through 4m, respectively.

FIG. 3 shows a configuration of the user unit 4a. The other user units 4b through 4m are configured similarly. The user unit 4a is composed of a video signal input section 21a, a video signal adjustment section 22a, a video signal output section 23a, an A/D converter 24a and a microcomputer 25a. The video signal input section 21a receives the reference signal supplied from the main unit 3, and outputs it to the video signal adjustment section 22a. The video signal adjustment section 22a adjusts the reference signal and supplies the adjusted reference signal to the video signal output section 23a and the A/D converter 24a. The A/D converter 24a converts the reference signal into a digital signal, which is then supplied to the microcomputer 25a. Then, the microcomputer 25a controls the video signal adjustment section 22a so that the output signal of the video signal adjustment section 22a can be optimized by using the output level of the reference signal.

The KVM switch thus configured is often required to change the server units 2, the main units 3 and/or the user units 4 to add a new function or improve the performance. However, this change may cause some units to fail to communicate with each other. For example, this problem often arises when different models of units are included in the KVM switch or different versions of units are included even when the units are of an identical model.

Japanese Patent Application Publication No. 9-219803 discloses a method for managing the versions of replaceable devices in which a management table is used to manage information about allowed combinations of devices. Information about the versions of devices actually used is acquired and is compared with the information described in the management table in order to determine whether the versions of the actually used devices match each other. If there is a device having version mismatch, this device is inhibited from working.

SUMMARY OF THE INVENTION

The present invention has been made in view of the above circumstance and provides a communication apparatus, a KVM switch and a communication control method.

According to an aspect of the present invention, there is provided a communication unit that is provided between one of computers and one of input/output devices that processes a video signal from said one of the computers and a control signal supplied from said one of the input/output devices and used for controlling said one of the computers, the communication unit including: a first part communicating with another communication unit to inform said another communication unit of unit type information about the communication unit and receive unit type information about said another communication unit therefrom; and a second part controlling communications with said another communication unit on the basis of the unit type information acquired from said another communication unit.

According to another aspect of the present invention, there is provided a KVM switch including: server units respectively connected to computers; user units respectively connected to input/output devices for transmitting signals to the computers and receiving signals from the computers; and a main unit that connects the server units and the user units, wherein each of the server units, user units and main unit is a communication unit and includes: a first part communicating with another communication unit to inform said another communication unit of unit type information about the communication unit and receive unit type information about said another communication unit therefrom; and a second part controlling communications with said another communication unit on the basis of the unit type information acquired from said another communication unit.

According to yet another aspect of the present invention, there is provided a communication control method in a KVM switch including: server units respectively connected to computers; user units respectively connected to input/output devices for transmitting signals to the computers and receiving signals from the computers; and a main unit that connects the server units and the user units, wherein each of the server units, user units and main unit is a communication unit, the method including communicating with another communication unit to inform said another communication unit of unit type information about the communication unit and receive unit type information about said another communication unit therefrom; and controlling communications with said another communication unit on the basis of the unit type information acquired from said another communication unit.

BRIEF DESCRIPTION OF THE DRAWINGS

FIG. 9 shows an exemplary function table used in the first embodiment;

FIG. 10 shows a list of functions of a set of units that consist of one of the server units, the main unit and one of the user units;

DESCRIPTION OF THE PREFERRED EMBODIMENTS

A description will now be given of embodiments of the present invention with reference to the accompanying drawings.

First Embodiment

Figure 1:
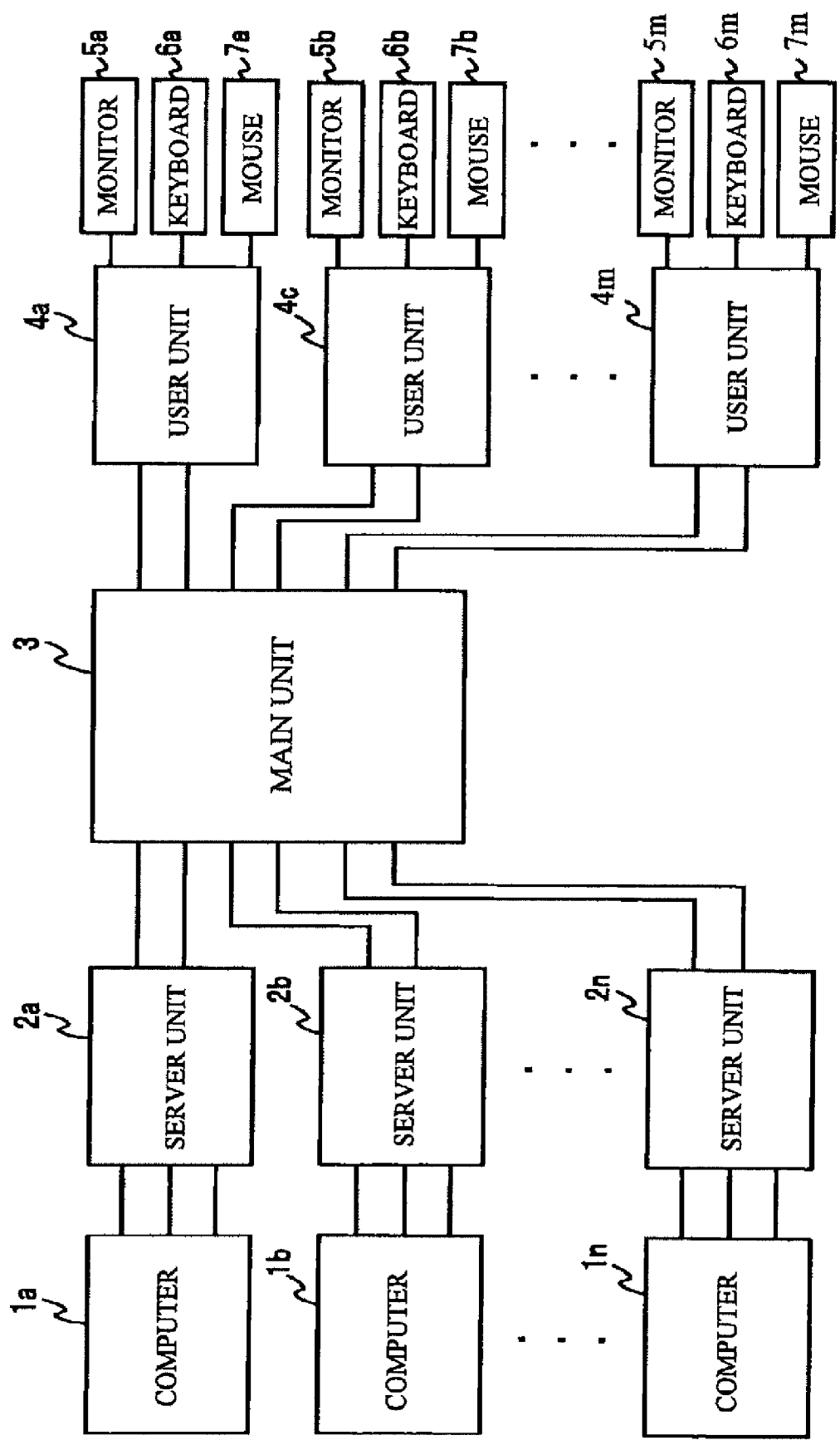
FIG. 1 is a block diagram of an entire structure of a KVM switch.
Figure 2:
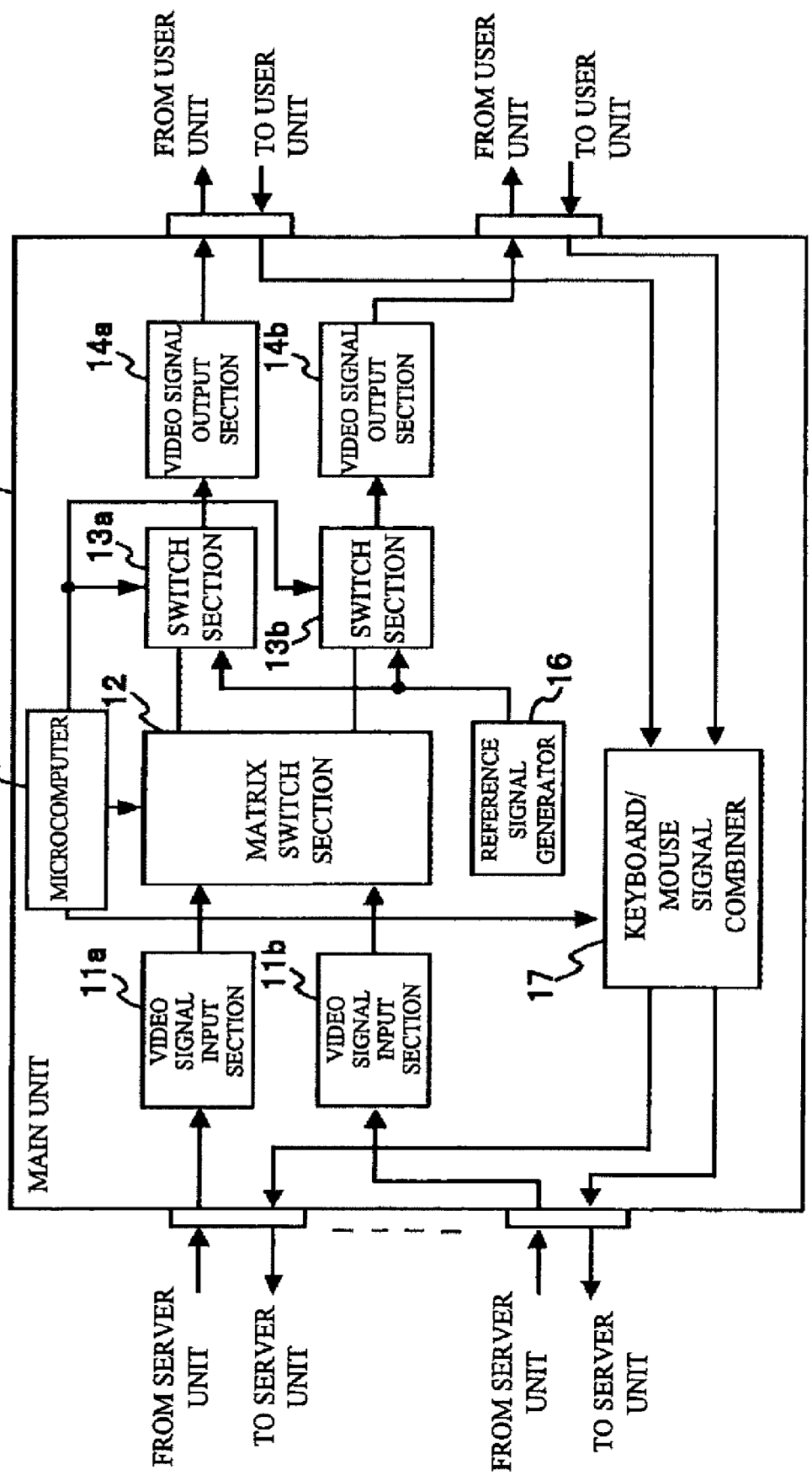
FIG. 2 is a block diagram of a structure of a conventional main unit.
Figure 3:
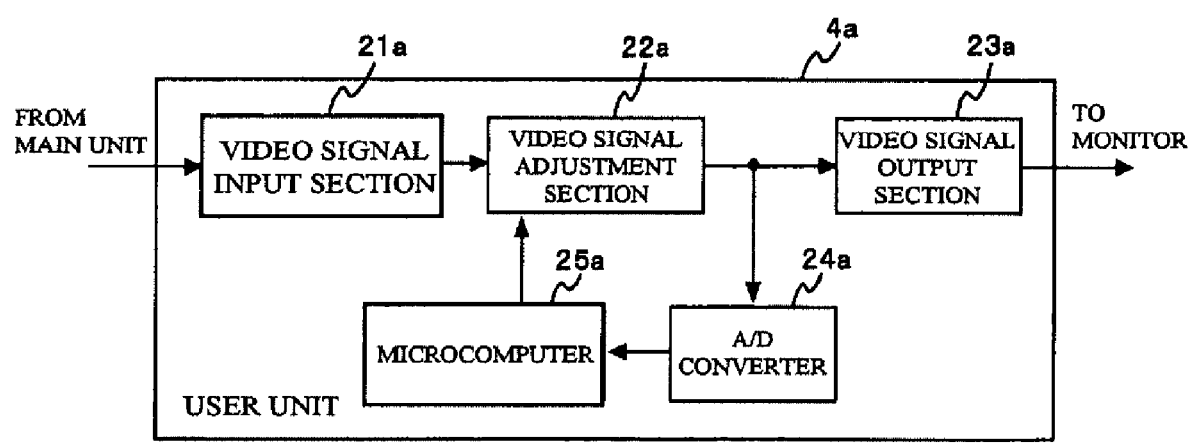
FIG. 3 is a block diagram of a structure of a conventional user unit.

A KVM switch of a first embodiment has the same block configuration as shown in FIG. 1. That is, the KVM switch of the first embodiment includes the server units $2a$ through $2n$ to which the computers $1a$ through $1n$ are respectively connectable, the main unit 3, and the user units $4a$ through $4m$ to which input/output devices composed of monitors 5, keyboards 6 and mouses 7 are connectable.

Figure 4:
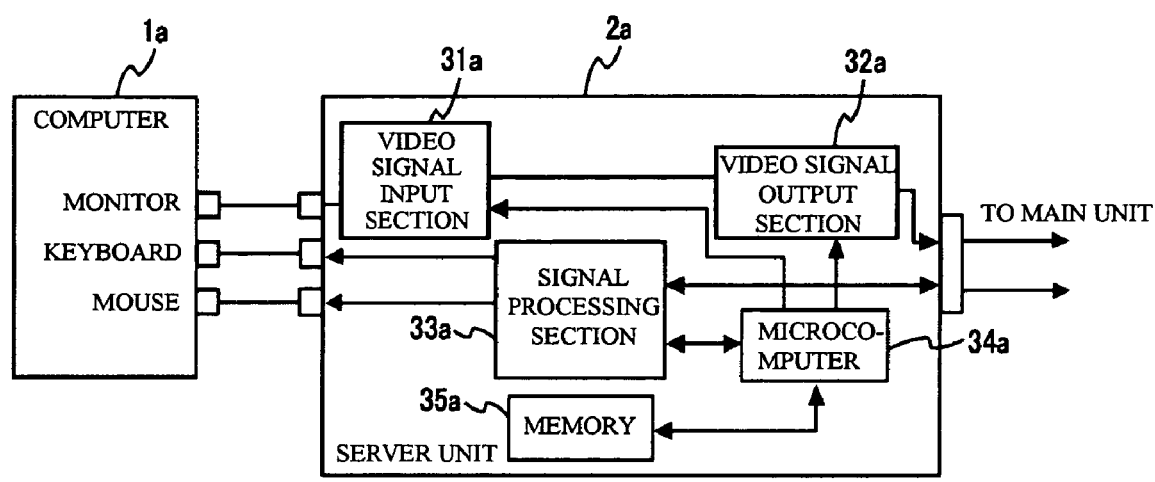
FIG. 4 is a block diagram of a structure of a server unit in accordance with a first embodiment.

FIG. 4 is a block diagram of a configuration of the server unit $2a$ employed in the first embodiment. Each of the other server units $2b$ through $2n$ is configured as shown in FIG. 4. The server unit $2a$ includes a video signal input section $31a$, a video signal output section $32a$, a signal processing section $33a$, a microcomputer $34a$ and a memory $35a$.

The video signal output by the computer $1a$ is applied to the video signal input section $31a$ of the server unit $2a$, and is output to the video signal output section $32a$. Then, the video signal from the video signal output section $32a$ is output to the main unit 3. The control signals of the keyboard and mouse are combined between the user unit $4a$ and the server unit $2a$, and are transmitted over a single cable. The control signals of the keyboard and mouse applied to the server unit $2a$ are separated into the respective control signals by the signal processing section $33a$. The control signals thus separated are transmitted over separate cables, and are then applied to a keyboard signal input terminal and a mouse signal input terminal of the computer $1a$, respectively.

The microcomputer $34a$ sets the video signal input section $31a$, the video signal output section $32a$ and the signal processing section $33a$ on the basis of unit type information supplied from the main unit 3. The setting process will be described in detail later. The memory $35a$ stores unit type information, which may include firmware for controlling the microcomputer $34a$, version information on the server unit $2a$ and model information thereon.

Figure 5:
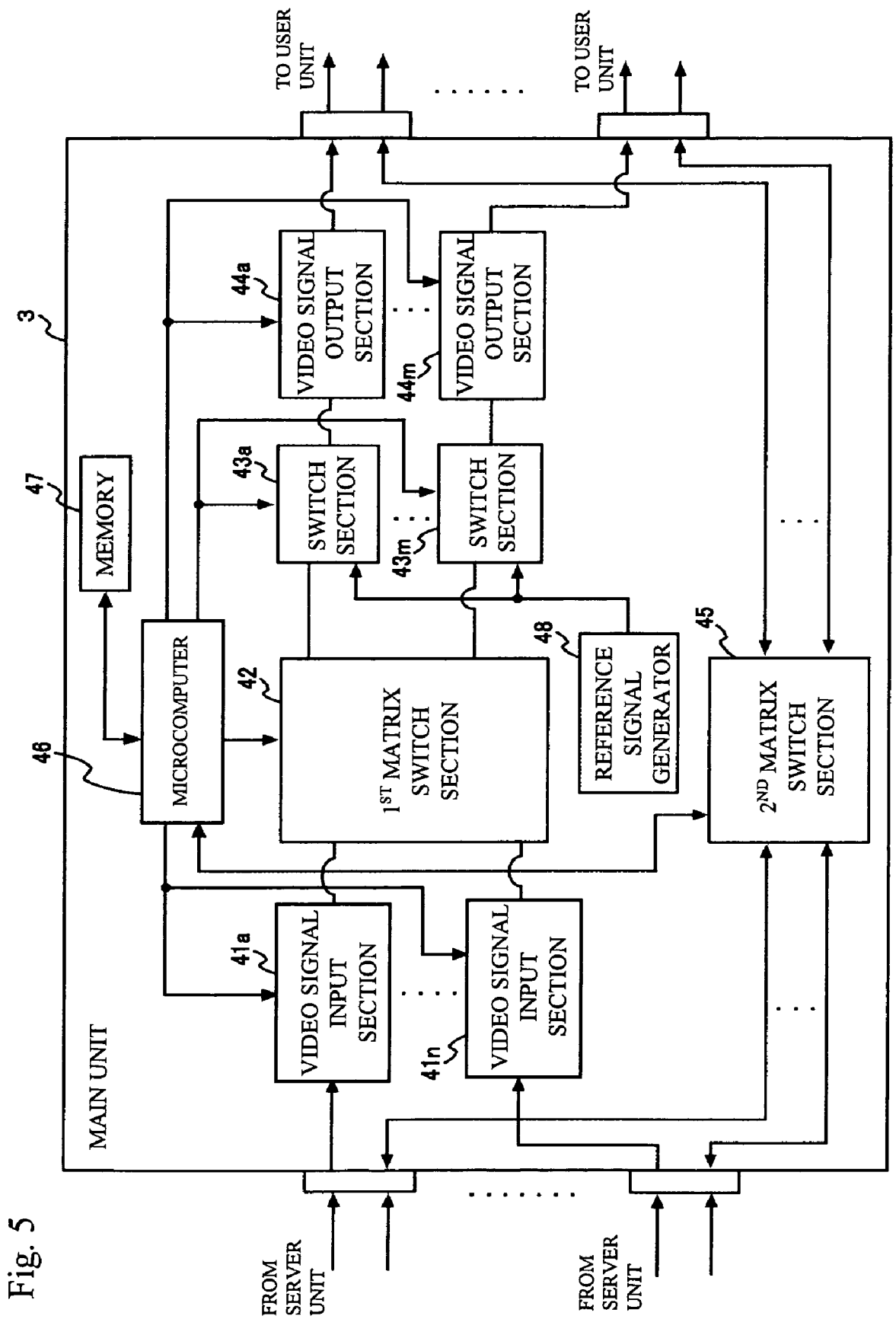
FIG. 5 is a block diagram of a structure of a main unit in accordance with the first embodiment.

FIG. 5 shows a configuration of the main unit 3. The main unit 3 includes video signal input sections $41a$ through $41n$ respectively associated with the server units $2a$ through $2n$, a first matrix switch section 42, switch sections $42a$ through $43m$ respectively associated with the user units $4a$ through $4m$, and video signal output sections $44a$ through $44m$ respectively associated therewith. Further, the main unit 3 includes a reference signal generator 48 and a second matrix switch section 45. Further, the main unit 3 includes a microcomputer 46, a memory 47 and a reference signal generator 48.

The video signals output by the server units $2a$ through $2n$ are applied to the video signal input sections $41a$ through $41n$, respectively, and are then applied to the first matrix switch section 42. The first matrix switch section 42 selects the video signal output sections $44a$ through $44m$ to which the input video signals are to be applied. Under the control of the microcomputer 46, the first matrix switch section 42 switches the switch sections $43a$ through $43m$ to which the input video signals are to be routed. The switch sections $43a$ through $43m$ select either the input video signals from the first matrix switch section 42 or reference signals generated by the reference signal generator 48 under the control of the microcomputer 46. The video signal output sections $44a$ through $44m$ output the received signals to the user units $4a$ through $4m$, respectively.

The second matrix switch section 45 receives the control signals of the keyboards $6a$ through $6m$ and the mouses $7a$ through $7m$, and outputs these signals to the server units $2a$ through $2n$.

The memory 47 stores the firmware used for controlling the microcomputer 46. The microcomputer 46 controls switching of the first matrix switch section 42, the switch sections $43a$ through $43m$, and the second matrix switch section 45. The microcomputer 46 is notified of unit type information supplied from the server units $2a$ through $2n$ and the user units $4a$ through $4m$, and sets communication functions of the video signal input sections $41a$ through $41n$, the first matrix switch section 42, the second matrix switch section 45 and the video signal output sections $44a$ through $44m$ on the basis of the unit type information.

Figure 6:
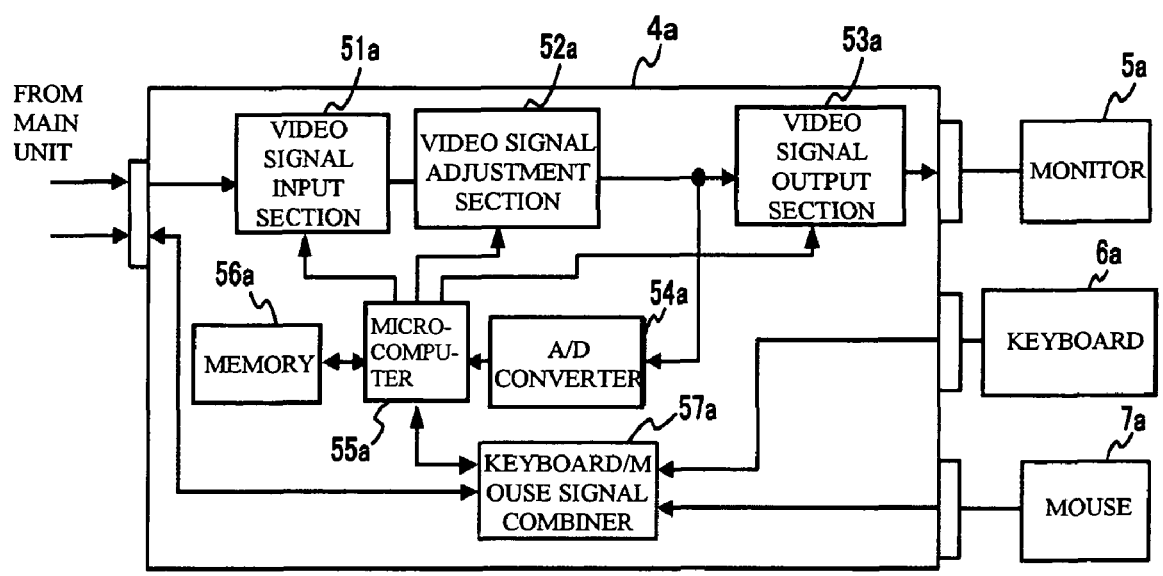
FIG. 6 is a block diagram of a structure of a user unit in accordance with the first embodiment.

FIG. 6 is a block diagram of an exemplary configuration of the user unit $4a$. Each of the remaining user units $4b$ through 4m is configured similarly. The user unit 4a includes a video signal input section 57a, a video signal adjustment section 52a, a video signal output section 53a, an A/D converter 54a, a microcomputer 55a, a memory 56a and a keyboard/mouse signal combiner 57a. The video signal input section 51a receives the video signal from the main unit 3. The video signal adjustment section 52a adjusts the signal level of the video signal. The video signal output section 53a outputs the video signal having the adjusted signal level. The A/D converter 54a converts the reference signal output by the video signal adjustment section 52a into a digital signal. The microcomputer 55a adjusts the signal output level of the video signal adjustment section 52a on the basis of the digitized reference signal. The memory 56a stores data used by the microcomputer 55a.

The keyboard/mouse signal combiner 57a combines a control signal of the keyboard and a control signal of the mouse. A combined signal is transmitted to the main unit 3 over a single cable.

The memory 56a stores firmware used for controlling the microcomputer 55a. The microcomputer 55a adjusts the video signal adjustment section 52a on the basis of the digitized reference signal from the A/D converter 54a. The microcomputer 55a is notified of the unit type information from the main unit 3, and sets communication functions of the video signal input section 51a, the video signal adjustment section 52a and the video signal output section 53a.

According to the first embodiment, the server units 2, the main unit 3 and the user units 4a can communicate with each other even when there are differences in the versions and/or models of units. For example, the server unit 2a, the main unit 3 and the user unit 4 can communicate with each other as follows.

A first communication after power on is directed to connection confirmation. The first communication takes place at a speed at which communications is ensured irrespective of versions and models of units.

It is also required to know the specification of the other party unit in communication in order to realize communications between different versions and/or models of units. Thus, the unit on the master side sends data for connection confirmation in the first or initial communication after power on in order to know the specification of the unit on the slave side. Data for connection confirmation may be transmitted through a communication path for video signals or another communication path for the control signals of the keyboard and mouse. In communications between the server unit 2a and the main unit 3, the server unit 2a serves as a unit on the master side (master unit), and the main unit 3 serves as a unit on the slave side (slave unit). In communications between the main unit 3 and the user unit 4a, the main unit 3 serves as a unit on the master side (master unit), and the user unit 4a serves as a unit on the slave side (slave unit).

Figure 7:
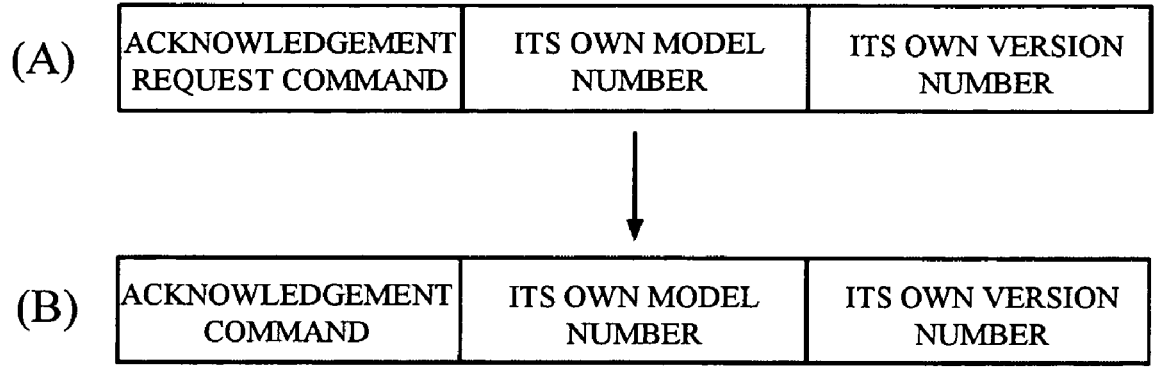
FIG. 7 shows communication formats for connection confirmation used in the first embodiment.

FIG. 7 shows an exemplary communication format for the connection confirmation that is carried out through the first communication. The master unit sends data described in a communication format shown in part (A) of FIG. 7 to the slave unit. The data includes an acknowledgement request command to the slave unit, and a model number and a version number of the master unit. The slave unit receives the data described in the communication format shown in part (A) of FIG. 7, and recognizes the specification (model number and version number) of the master unit.

The slave unit that has received the data in the communication format shown in part (A) of FIG. 7 sends data described in a communication format shown in part (B) of FIG. 7 back to the master unit. The data described in the communication format shown in part (B) of FIG. 7 includes an acknowledgement command to the master unit, and a model number and a version number of the slave unit. The master unit receives the data described in the communication format shown in part (B) of FIG. 7, and recognizes the specification (model number and version number) of the slave unit.

Figure 8:
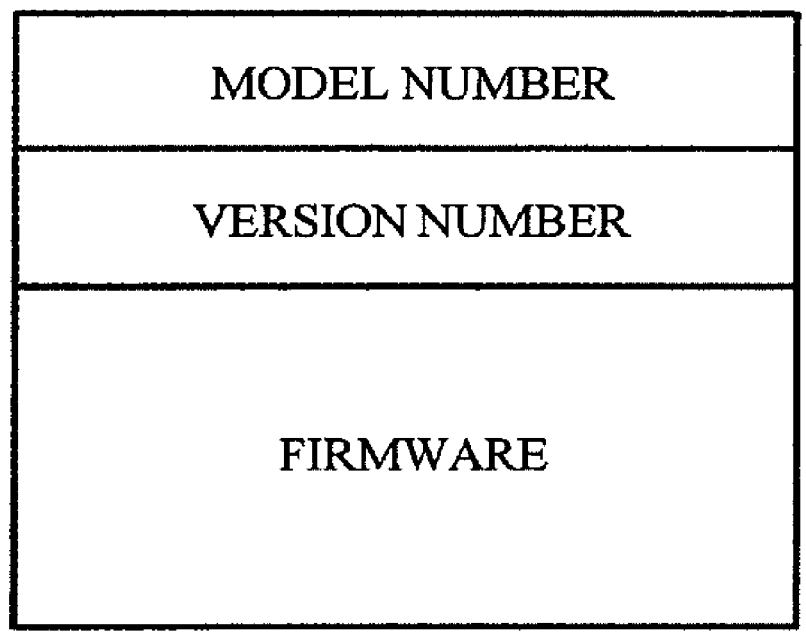
FIG. 8 shows data stored in a memory used in the first embodiment.

FIG. 8 shows data stored in the memories 35a, 47 and 56a of the server unit 2a, the main unit 3 and the user unit 4a, respectively. Data includes firmware used by the microcomputers 34a, 46 and 55a, and the specification (model number and version number) acquired through the first communication for connection confirmation. The memory 47 of the main unit 3 stores information about the specifications of both the server unit 2a and the user unit 4a.

FIG. 9 shows a function table in which functions of the unit of interest are described in association with the model number and the version number. The function table is stored in an data area of the firmware. The microcomputers 34a, 46 and 55a of the server unit 2a, the main unit 3 and the user unit 4a look up the function table specified by the model number and the version number of the connecting destination unit obtained, and acquires information about the speed and functions of the other party unit. Further, the microcomputers acquire information about a communication speed and functions that can be realized in communications with the other party unit.

If the model number and the version number of the other party unit are not described in the function table, the microcomputers made a decision that communications are not available, and visually or acoustically notifies an operator of the decision made by an LED or buzzer.

After the connection confirmation through the first communication, one of the server units 2 and one of the user units 4 that are to be connected to the main unit 3 and communicate with the main unit 3 are selected. One sever unit, the main unit and one user unit which communicate with each other form a set of units.

It is now assumed that a set of units have functions shown in FIG. 10. Functions B and C are common to all of the three units. The user unit 4 does not handle function A, and the server unit 2 does not handle function D. Since the main unit 3 communicate with both the server unit 2 and the user unit 4, the main unit 3 functions as a parent unit that informs the serve unit 2 and the user unit 4 of unusable functions. In the example shown in FIG. 10, the main unit 3 informs the server unit 2 that the function A is unusable, and informs the user unit 4 that the function D is unusable. Then, the main unit 3 communicates with the server unit 2 and the user unit by utilizing the functions B and C.

Then, the main unit 3 informs another set of units that have the functions that are recognized as being unusable in the above set of units by using the table shown in FIG. 9 that the functions are not usable. For example, it is assumed that a first set of units have a function that is unusable in communication with the user unit or the server unit and the main unit detects the unusable function. In this case, if a second set of units have the same function as that unusable in the first set of units, the main unit of the first set informs the server unit or the user unit of the second set that the function is not usable.

Figure 11:
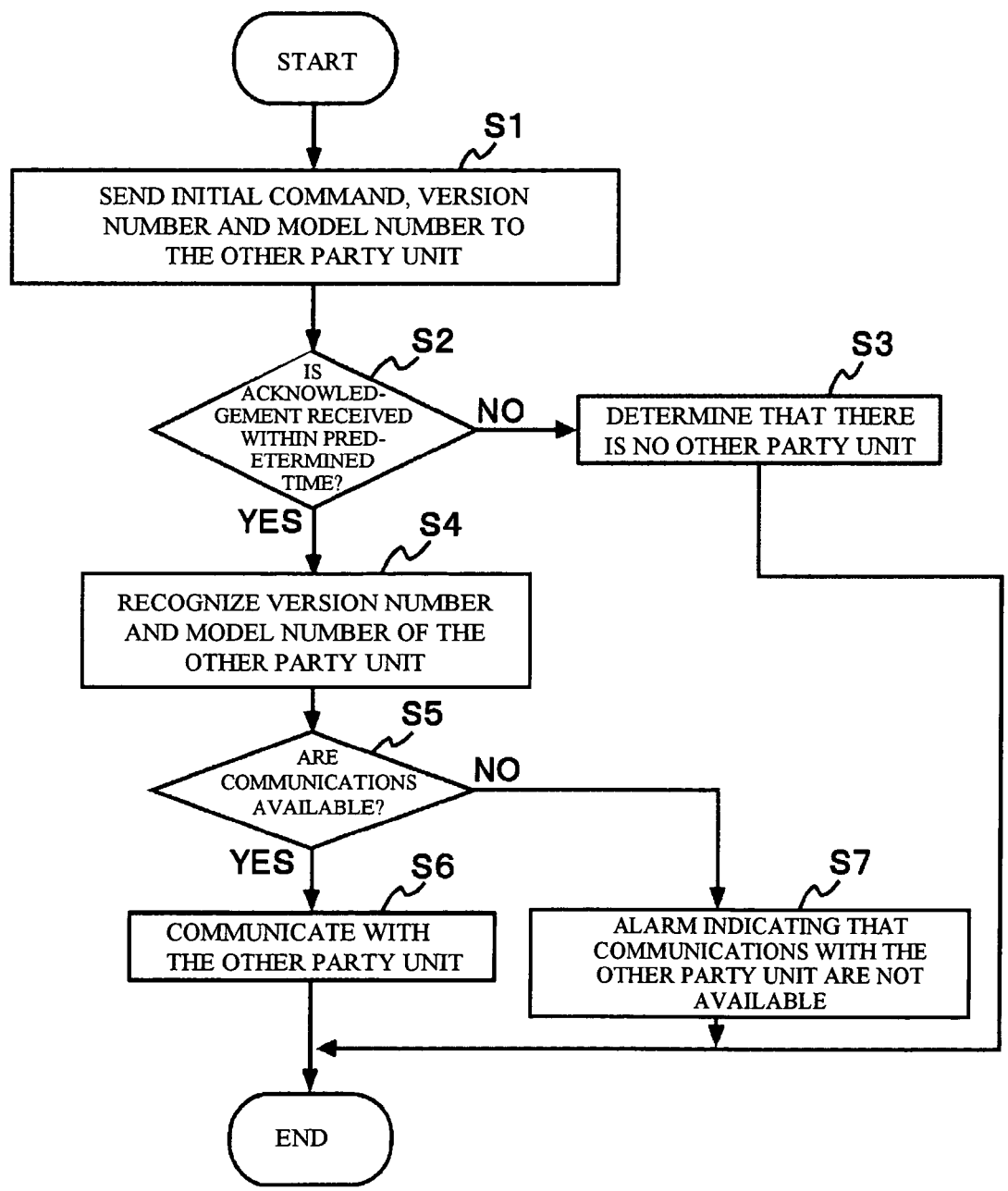
FIG. 11 is a flowchart of a process sequence executed when a connection confirmation is made by a unit on a master side.

A description will now be given, with reference to a flowchart of FIG. 11, of a process sequence of the master unit. In communications between the server unit 2 and the main unit 3, the main unit 3 functions as a master unit. In communications between the main unit 3 and the user unit 4, the user unit 4 functions as a master unit.

After power on, the master unit sends the data described in the communication format shown in part (A) of FIG. 7 to the slave unit in communication with the slave unit for connection confirmation (step S1). As has been described, the data in the communication format shown in part (A) of FIG. 7 includes the acknowledgement request command, and the version number and model number of the master unit.

If there is no acknowledgement from the slave unit when a predetermined time elapses from the transmission of data (step S2/NO), the master unit determines that no connection with the slave unit is made (step S3), and ends the process.

In contrast, if the acknowledgement is received from the slave unit within the predetermined time (step S2/YES), the master unit recognizes the version number and model number of the slave unit from the received data (step S4).

Next, the master unit refers to the version number and model number of the slave unit thus recognized, and determines whether communications with the slave unit are available (step S5). If the version number and model number of the slave unit have been registered in the function table (step S5/YES), the master unit determines that communications with the slave unit are available (step S6).

When the master unit determines that communications with the slave unit are available, the master unit refers to the function table to detect the available functions of the slave unit and controls communications so that the detected functions are met. For example, the master unit communicates with the slave unit at a communication speed at which the slave unit can operate. Further, the master unit controls communications with only functions that are available in the slave unit.

If the version number and model number have not been registered in the function table (step S5/NO), the master unit determines that communications with the slave unit connected are not available and informs the operator of this determination result through the LED or alarm sound.

As described above, according to the present embodiment, the set of units connected inform the other units of the unit type information and communicate with each other based on the unit type information, so that communications suitable for the functions of the other party units can take place.

If the slave unit is busy in communications, the slave unit may not respond to the acknowledgement request by the master unit or may take a considerable time to respond thereto.

Figure 12:
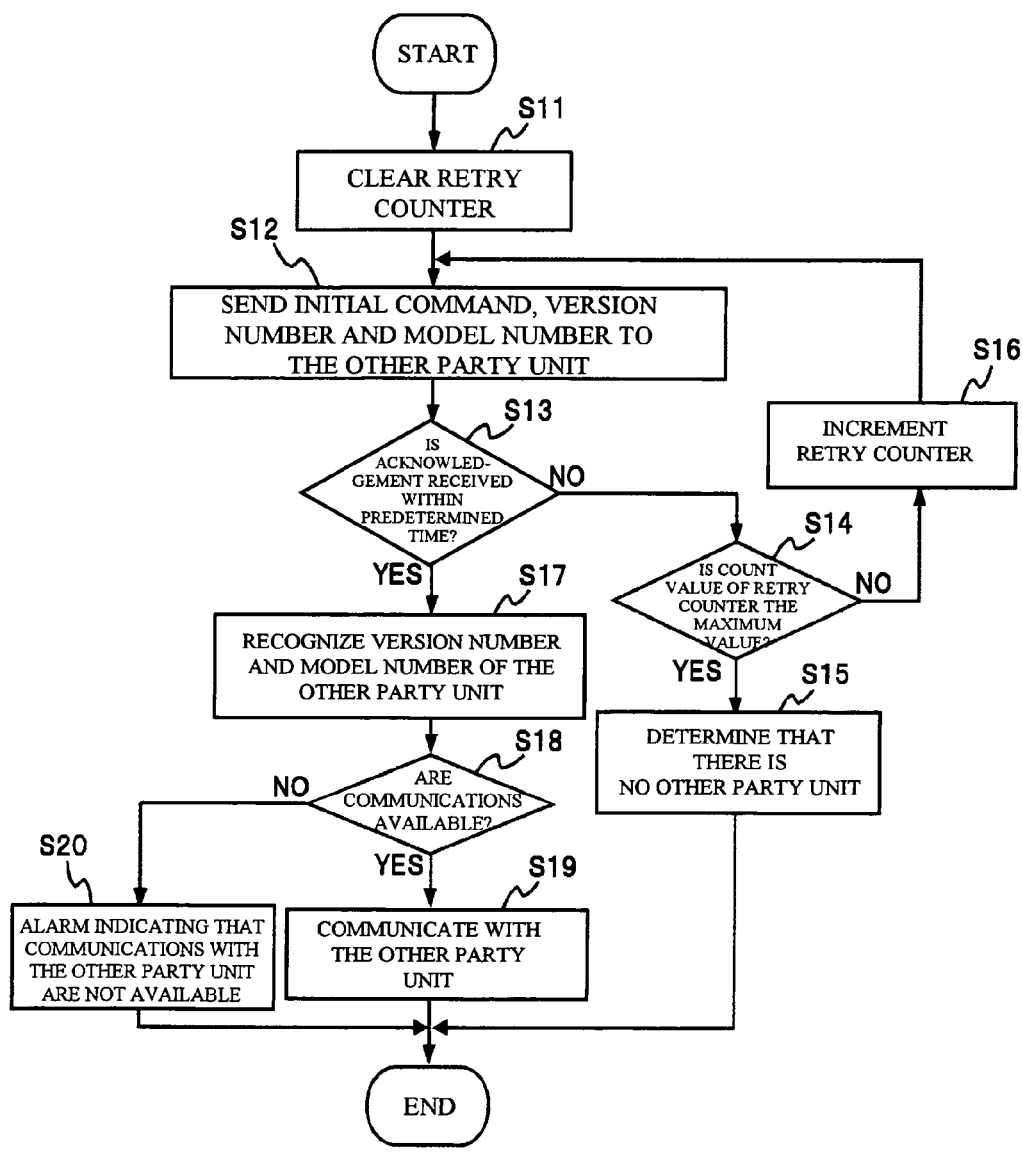
FIG. 12 is a flowchart of a process sequence executed by a unit on a master side when a retry counter is used.

In order to cope with the above situation, the master unit may be equipped with a retry counter, which allows the acknowledgement request to be sent a predetermined number of times. If no acknowledgement is received even after the predetermined number of times that the acknowledgement request is repeatedly sent, the master unit may conclude that there is no other party unit. The sequence for the above process is shown in a flowchart of FIG. 12.

The master unit initializes the retry counter when the slave unit is connected (step S11). Next, the master unit adds its own version number and model number to the acknowledgement request command and sends it to the slave unit in the first communication after the connection is made (step S12).

If the no acknowledgement is not received even after the predetermined time elapses from transmission of data (step S13/NO), the master unit determines whether the count value of the retry counter has reached a predetermined maximum value (step S14). When the count value of the retry counter has not yet reached the predetermined maximum value (step S14/NO), the master unit increments the count value (step S16), and repeatedly executes the process starting from step S12. Then, when the count value of the retry counter has reached the maximum value (step S14/YES), the master unit determines that there is no connection with the slave unit (step S15), and ends the process.

When the acknowledgement is received from the slave unit before the count value of the retry counter reaches the maximum value (step S13/YES), the master unit recognizes the version number and model number of the slave unit from the received data (step S17). The subsequent process is the same as the flowchart of FIG. 1, and a description thereof will be omitted here.

Second Embodiment

A second embodiment is directed to rewriting the version information and firmware when the version of the product is updated or a new model is available. An exemplary rewriting sequence is shown in FIG. 13.

A new firmware may be stored in a hard disc of the computer 1a, and the server unit 2a connected to the computer 1a acquires the new firmware.

Figure 13:
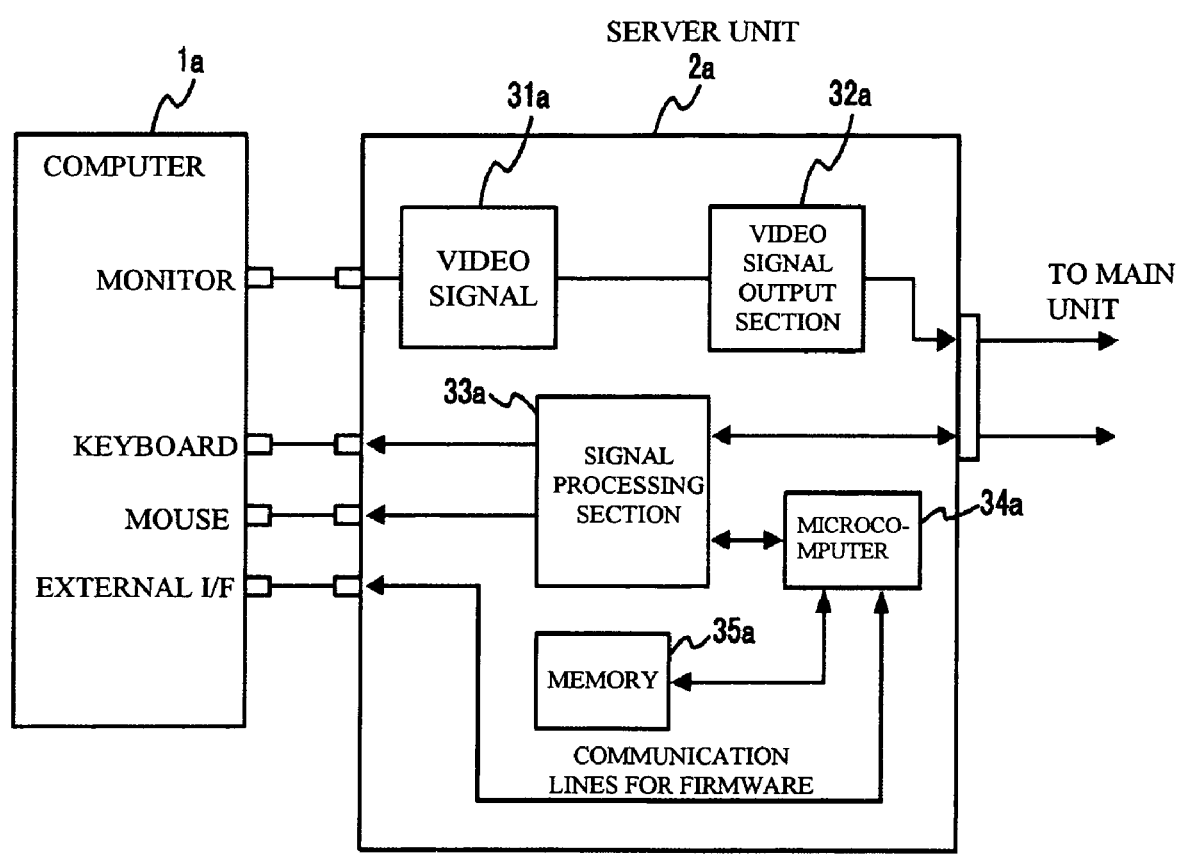
FIG. 13 is a block diagram of a server unit in accordance with a second embodiment.

As shown in FIG. 13, the server unit 2a is connected to the computer 1a by USB (Universal Serial Bus) or serial communication. Necessary information including firmware is acquired from the computer 1a via a communication line for firmware. When the firmware thus acquired is firmware of the server unit 2a, the server unit 2a rewrites the firmware stored in the memory 35a. When the acquired firmware is not firmware of the server unit 2a, the server unit 2a transfers the firmware to the main unit 3 by a firmware transfer command. The firmware and information transferred from the server unit 2a to the main unit 3 uses a signal line used for transmitting the video signal from the server unit 2a to the main unit 3 or another signal line used for transmitting the control signals of the keyboard and mouse.

When the firmware acquired from the server unit 2a is the firmware of the main unit 3, the main unit 3 rewrites the firmware stored in a memory 47. When the acquired firmware is not the firmware of the main unit 3, the main unit 3 transfers the firmware to the user unit 4a by a firmware transfer command. The firmware and information transferred from the main unit 3 to the user unit 4a uses a signal line used for transmitting the video signal from the main unit 3 to the user unit 4a or another signal line used for transmitting the control signals of the keyboard and mouse. The user unit 4a rewrites the firmware with that transferred from the main unit 3.

According to the second embodiment, information including firmware can easily be rewritten in the server unit 2, the main unit 3 and the user unit 4.

The present invention is not limited to the specifically disclosed embodiments, but may include other embodiments and variations without departing from the scope of the present invention.

The present application is based on Japanese Patent Application No. 2007-016261 filed Jan. 26, 2007, the entire disclosure of which is hereby incorporated by reference.

What is claimed is:

1. A communication unit that is provided between one of computers and one of input/output devices that processes a video signal from said one of the computers and a control signal supplied from said one of the input/output devices and used for controlling said one of the computers, the communication unit comprising:
a first part communicating with another communication unit to inform said another communication unit of unit type information about the communication unit and receive unit type information about said another communication unit therefrom; and a second part controlling communications with said another communication unit on the basis of the unit type information acquired from said another communication unit, wherein, when the second part identifies a function that is owned by said another communication unit and is unusable in the communication unit by referring to the unit type information acquired from said another communication unit, the second part informs said another communication unit of said function that is unusable in the communication unit.

2. The communication unit as claimed in claim 1, wherein the second part identifies a function usable for communicating with said another communication unit by referring to the unit type information acquired from said another communication unit, and communicates with said another communication unit with the function identified.

3. The communication unit as claimed in claim 1, wherein the second part determines a communication speed at which the communication unit communicates with said another communication unit on the basis of the unit type information acquired from said another communication unit.

4. A communication unit that is provided between one of computers and one of input/output devices that processes a video signal from said one of the computers and a control signal supplied from said one of the input/output devices and used for controlling said one of the computers, the communication unit comprising:
    a first part communicating with another communication unit to inform said another communication unit of unit type information about the communication unit and receive unit type information about said another communication unit therefrom; and
    a second part controlling communications with said another communication unit on the basis of the unit type information acquired from said another communication unit,
    wherein the first part communicates with said another communication unit at a predetermined communication speed enable communications irrespective of types of communication units, and
    when the second part identifies an unavailable communication speed of said another communication unit by referring to the unit type information of said another communication unit, the second part informs said another communication unit that the communication unit cannot communicate at the unavailable communication speed.

5. The communication unit as claimed in claim 1, wherein:
    when the second part receives a rewrite program from said another communication unit, the second part determines whether the rewrite program should be used for updating in the communication unit;
    when the second part determines that the rewrite program should be used for updating, the second part rewrites a corresponding program in the communication unit; and
    when the second part determines that the rewrite program should not be used, the second part transfers the rewrite program to yet another communication unit connected to the communication unit.

6. The communication unit as claimed in claim 4, wherein when the second part determines that communications with said another communication unit are not available, this determination result is visually output to an operator of the communication unit.

7. The communication unit as claimed in claim 4, wherein when the second part determines that communications with said another communication unit are not available, this determination result is acoustically output to an operator of the communication unit.

8. A KVM switch comprising:
    server units respectively connected to computers;
    user units respectively connected to input/output devices for transmitting signals to the computers and receiving signals from the computers; and
    a main unit that connects the server units and the user units,
    wherein each of the server units, the user units and the main unit is a communication unit and includes:
        a first part communicating with another communication unit to inform said another communication unit of unit type information about the communication unit and receive unit type information about said another communication unit therefrom; and
        a second part controlling communications with said another communication unit on the basis of the unit type information acquired from said another communication unit,
    wherein the second part of the main unit acquires the unit type information about one of the server units and one of the user units, and determines whether there is a function commonly unusable in the server and user units, and
    the main unit informs the ones of the server and user units of the function identified as being unusable.

9. The KVM switch as claimed in claim 8, wherein the second part of the main unit functions as a master unit in exchange of unit type information with the server units, and sends data to the second part of the server units, in which the data includes unit type information about the main unit and a request for unit type information about the server units.

10. The KVM switch as claimed in claim 8, wherein the second part of each of the user units functions as a master unit in exchange of unit type information with the main unit, and sends data to the second part of the main unit, in which the data includes unit type information about a corresponding one of the user units and a request for unit type information about the main unit.

11. The KVM switch as claimed in claim 8, wherein the second part of the main unit informs the server and user units other than said ones of the server and user units of the function identified as being unusable.

12. The KVM switch as claimed in claim 8, wherein
    when the second part of one of the server units receives a rewrite program from a corresponding one of the computers, the second part determines whether the rewrite program should be used for updating in said one of the server units;
    when the second part of said one of the server units determines that the rewrite program should be used for updating, the second part rewrites a corresponding program in said one of the server units; and
    when the second part determines that the rewrite program should not be used, the second part transfers the rewrite program to the second part of the main unit.

13. The KVM switch as claimed in claim 12, wherein
    when the second part of the main unit receives a rewrite program from one of the server units, the second part determines whether the rewrite program should be used for updating in the main unit;
    when the second part of the main unit determines that the rewrite program should be used for updating, the second part rewrites a corresponding program in the main unit; and
    when the second part determines that the rewrite program should not be used, the second part transfers the rewrite program to the second parts of the user units.

14. A communication control method in a KVM switch including: server units respectively connected to computers; user units respectively connected to input/output devices for transmitting signals to the computers and receiving signals from the computers; and a main unit that connects the server units and the user units, wherein each of the server units, user units and main unit is a communication unit, the method comprising communicating with another communication unit to inform said another communication unit of unit type information about the communication unit and receive unit type information about said another communication unit therefrom;

identifying an unavailable communication speed of said another communication unit by referring to the unit type information of said another communication unit; and informing said another communication unit that the communication unit cannot communicate at the unavailable communication speed.

15. The communication unit as claimed in claim 1, wherein the unit type information includes a version number and a model number.

16. The communication unit as claimed in claim 4, wherein the unit type information includes a version number and a model number.

17. The KVM switch as claimed in claim 8, wherein the unit type information includes a version number and a model number.

* * * * *